(12) United States Patent
Koike et al.

(10) Patent No.: US 11,874,684 B2
(45) Date of Patent: Jan. 16, 2024

(54) OPERATION INPUT DEVICE

(71) Applicant: ALPS ALPINE CO., LTD., Tokyo (JP)

(72) Inventors: Asuka Koike, Miyagi (JP); Takeaki Maehata, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 47 days.

(21) Appl. No.: 17/653,718

(22) Filed: Mar. 7, 2022

(65) Prior Publication Data

US 2022/0187865 A1 Jun. 16, 2022

Related U.S. Application Data

(63) Continuation of application No. PCT/JP2020/037830, filed on Oct. 6, 2020.

(30) Foreign Application Priority Data

Oct. 9, 2019 (JP) .................................. 2019-185748

(51) Int. Cl.
*G05G 5/03* (2008.04)
*B60R 16/027* (2006.01)
(Continued)

(52) U.S. Cl.
CPC .............. *G05G 5/03* (2013.01); *B60R 16/027* (2013.01); *G06F 3/02* (2013.01); *G06F 3/033* (2013.01); *H01H 25/04* (2013.01)

(58) Field of Classification Search
None
See application file for complete search history.

(56) References Cited

U.S. PATENT DOCUMENTS

| 2011/0128135 A1* | 6/2011 | Periquet | F16F 9/535 340/407.2 |
| 2013/0112034 A1* | 5/2013 | Sano | B60R 16/027 74/520 |

FOREIGN PATENT DOCUMENTS

| JP | S57-086234 U | 5/1982 |
| JP | H07-302161 | 11/1995 |

(Continued)

OTHER PUBLICATIONS

International Search Report for PCT/JP2020/037830 dated Dec. 15, 2020.

*Primary Examiner* — Vicky A Johnson
(74) *Attorney, Agent, or Firm* — IPUSA, PLLC (57) ABSTRACT

An operation input device to be mounted on a vehicle includes a support part to be attached to the vehicle, an operating member supported by the support part and configured to be operated by a person, an operation sensing part configured to sense an operation on the operating member, a tactile feedback generating part provided inside the operating member and configured to give tactile feedback to the person, and a control part configured to control the tactile feedback generating part to produce the tactile feedback when the operation is sensed in the operation sensing part, the operating member is provided so as to extend from the support part in a first direction intersecting the traveling direction of the vehicle, and the operating member is restricted so as not to rotate in a swing operation in which a direction intersecting the first direction serves as the axis of rotation.

16 Claims, 11 Drawing Sheets

(51) Int. Cl.
*G06F 3/02* (2006.01)
*G06F 3/033* (2013.01)
*H01H 25/04* (2006.01)

(56) References Cited

FOREIGN PATENT DOCUMENTS

| | | |
|---|---|---|
| JP | H08-329788 | 12/1996 |
| JP | 2009-026509 | 2/2009 |
| JP | 2009-117119 | 5/2009 |
| JP | 2009117119 A * | 5/2009 |
| JP | 4342979 | 10/2009 |
| JP | 2010-062050 | 3/2010 |
| JP | 5843283 | 1/2016 |
| JP | 2017-126469 | 7/2017 |

* cited by examiner

FIG.11 a# OPERATION INPUT DEVICE

CROSS-REFERENCE TO RELATED APPLICATION

The present application is a continuation filed under 35 U.S.C. 111(a) claiming the benefit under 35 U.S.C. 120 and 365(c) of PCT International Application No. PCT/JP2020/037830, filed on Oct. 6, 2020, and designating the U.S., which is based on and claims priority to Japanese Patent Application No. 2019-185748, filed on Oct. 9, 2019. The entire contents of PCT International Application No. PCT/JP2020/037830 and Japanese Patent Application No. 2019-185748 are incorporated herein by reference.

BACKGROUND OF THE INVENTION

1. Field of the Invention

The disclosure herein generally relates to an operation input device.

2. Description of the Related Art

A lever-like input device that senses operation of a stalk is used as an operation input device for use for vehicles such as automobiles. By operating such a lever-like input device, the driver of the vehicle can manually operate the headlights, wipers, and so forth provided in the vehicle.

RELATED-ART DOCUMENTS

Patent Document

[Patent Document 1] Japanese Patent Publication No. 5843283
[Patent Document 2] Japanese Unexamined Patent Application Publication No. H7-302161
[Patent Document 3] Japanese Patent Publication No. 4342979

SUMMARY OF THE INVENTION

At present, operation input devices that are used in vehicles such as the one mentioned above are designed such that the operating part of a lever-like input device is manually moved and the position of the operating part is displaced, thereby inputting operation information. In recent years, however, there is a demand to be able to input operation information with almost no change in the position of the operating part.

According to at least one aspect of the herein-contained embodiments, an operation input device to be mounted on a vehicle includes a support part to be attached to the vehicle, an operating member supported by the support part and configured to be operated by a person, an operation sensing part configured to sense an operation on the operating member, a tactile feedback generating part provided inside the operating member and configured to give tactile feedback to the person, and a control part configured to control the tactile feedback generating part to produce the tactile feedback when the operation is sensed in the operation sensing part, in which the operating member is provided so as to extend from the support part in a first direction intersecting a traveling direction of the vehicle, and the operating member is restricted so as not to rotate in a swing operation in which a direction intersecting the first direction serves as an axis of rotation.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

According to the operation input device of the present disclosure, operation information can be input with almost no change in the position of the operating part.

Now, embodiments for carrying out the present disclosure will be described below with reference to the accompanying drawings. Note that the same members, parts, elements, and so forth will be assigned the same reference numerals and will not be described redundantly.

First Embodiment

Figure 1:
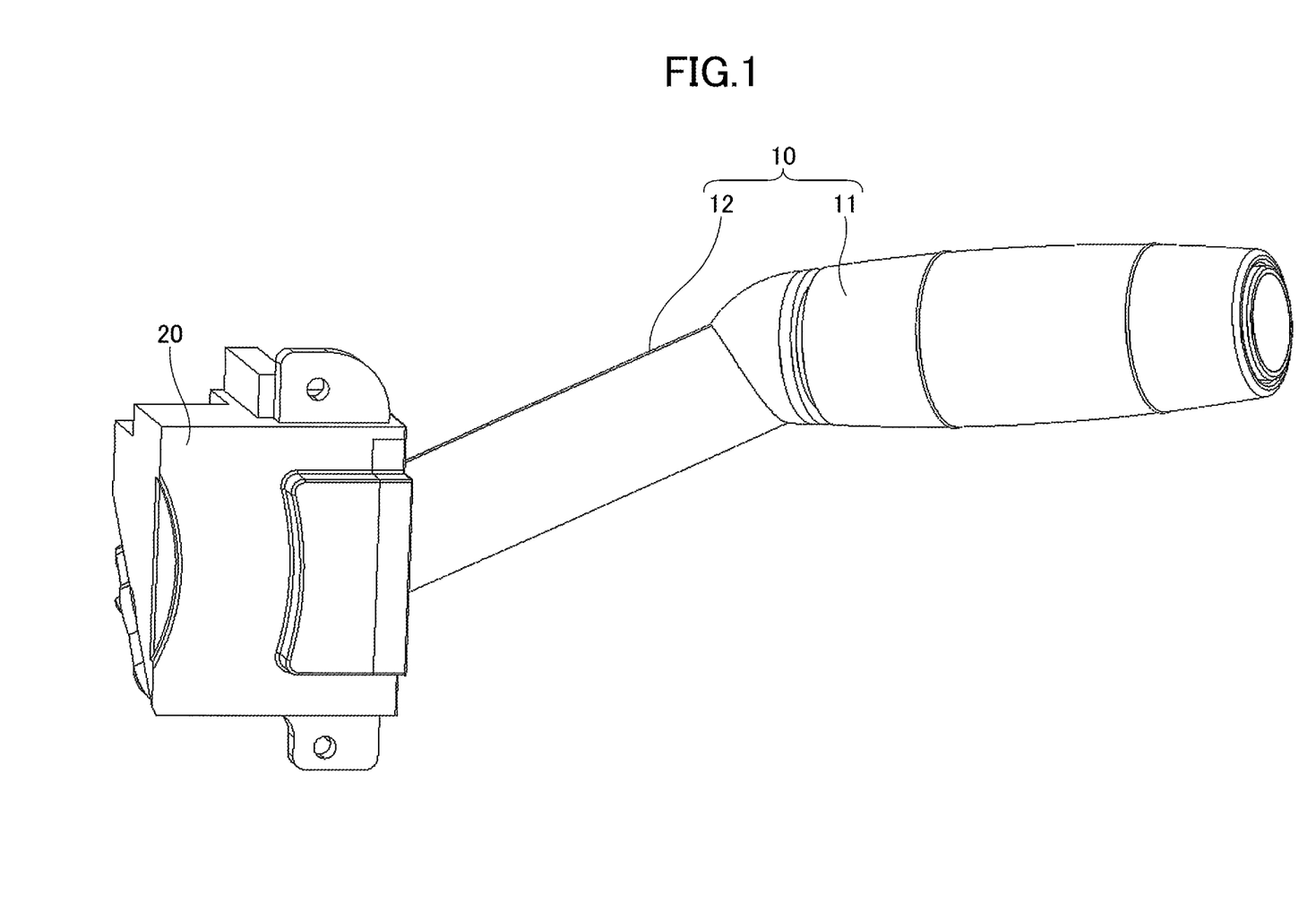
FIG. 1 is a perspective view of an operation input device according to a first embodiment.

Now, the operation input device according to the first embodiment will be described below with reference to FIG. 1 and FIG. 2. The operation input device according to the present embodiment is an automotive input device that is mounted near the steering of a vehicle such as an automobile, and that enables the headlights, wipers, and so forth provided in the vehicle to be operated manually. Up until now, when operating these components, it has been necessary to move the automotive input device at an angle of 5 degrees to 12 degrees. The operation input device according to the present embodiment enables input of operation information by moving the automotive input device only very slightly.

Figure 2:
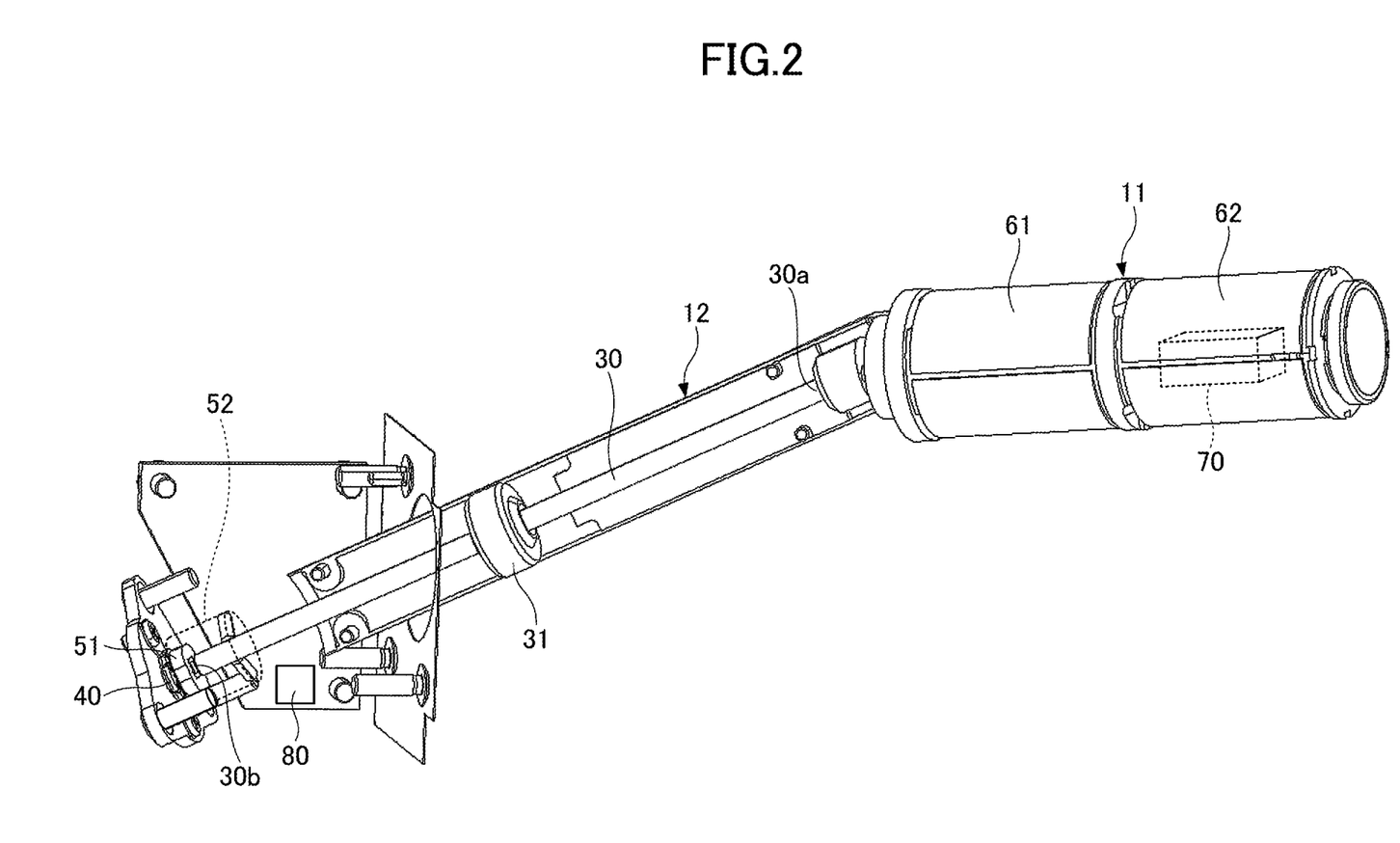
FIG. 2 is a diagram for explaining an internal structure of the operation input device according to the first embodiment.

As shown in FIG. 2, the operation input device according to the first embodiment includes a lever part 10, and a support part 20 that supports the lever part 10. In one side of the lever part 10, an operating part 11, which the driver of the vehicle actually operates with his/her hand, is provided. In the other side of the lever part 10, an end of a cylindrical part 12 is supported by the support part 20. In this application, the lever part 10 may be also referred to as an "operating member."

The support part 20 is attached to a predetermined portion of the vehicle, for example, in a portion near the steering. Note that the lever part 10 is provided such that the operating part 11 extends beyond the support part 20 in the first direction intersecting the vehicle's traveling direction. As will be described later, the lever part 10 is restricted so as not to rotate in swing operations, in which the direction intersecting the first direction is the axis of rotation.

FIG. 2 shows the inside of the operation input device according to the present embodiment. In the operation input device according to the present embodiment, an end of the cylindrical part 12 is fixed to the support part 20, and an operating shaft 30 is provided inside this cylindrical part 12. One end part 30a of the operating shaft 30 is connected to the operating part 11, and the other end part 30b is connected to a strain detection element 40, which is provided inside the support part 20, and which serves as an operation sensing part, via an elastic member 51 and a connecting member 52. The operating shaft 30 is provided inside the cylindrical part 12, which is formed in a cylinder-like shape. A fulcrum part 31 is provided in a substantially central portion inside the cylindrical part 12, and the operating shaft 30 is supported by the fulcrum part 31.

Furthermore, the operating part 11 is also formed in a cylinder-like shape. Inside the operating part 11, two capacitive sensors 61 and 62, placed in a cylinder-like arrangement, are provided. Further inside the operating part 11, a vibration generating element 70 is provided. Note that, preferably, the central axis of the cylindrical operating part 11 and the central axis of the two cylindrically-arranged capacitive sensors 61 and 62 are parallel to each other, or coincident with each other, more preferably.

Furthermore, for the overall control of the operation input device according to the present embodiment, a control part 80 is provided, for example, inside the support part 20. Although not shown, the control part 80 is connected to the strain detection element 40, the two capacitive sensors 61 and 62, the vibration generating element 70, and so forth. The control part 80 receives signals from the strain detection element 40 and the two capacitive sensors 61 and 62, and controls the vibration generating element 70 and others. Furthermore, it is also possible to provide an operating knob at the tip of the operating part 11, and make the operating knob capable of pressing operations in the first direction, or make the operating knob capable of rotation operations in which the first direction is the axis of rotation. The control part 80 is provided inside the support part 20, but may be provided outside the support part 20 instead.

Figure 3:
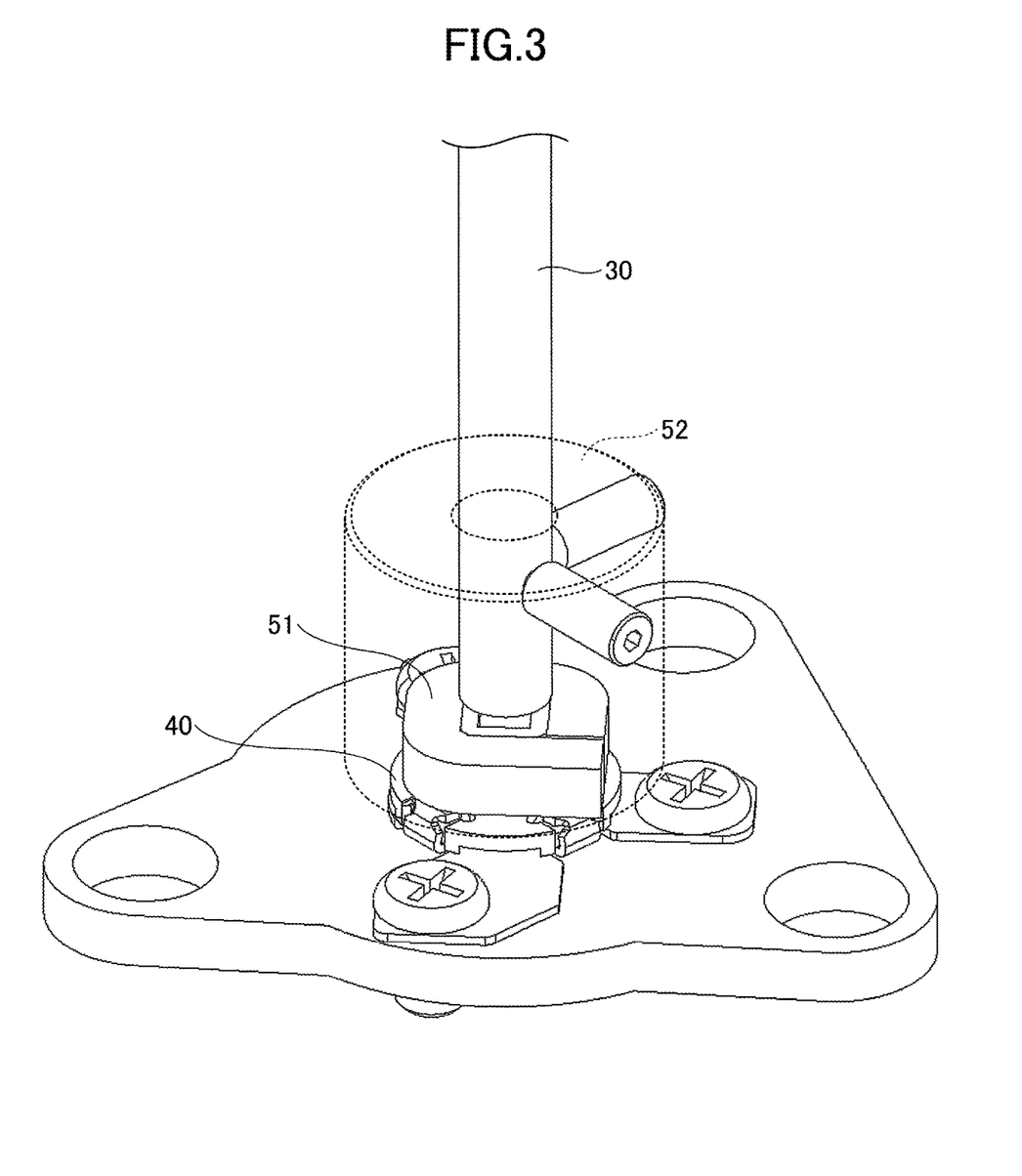
FIG. 3 is a perspective view of a portion in the operation input device according to the first embodiment where a strain detection element is provided.
Figure 4:
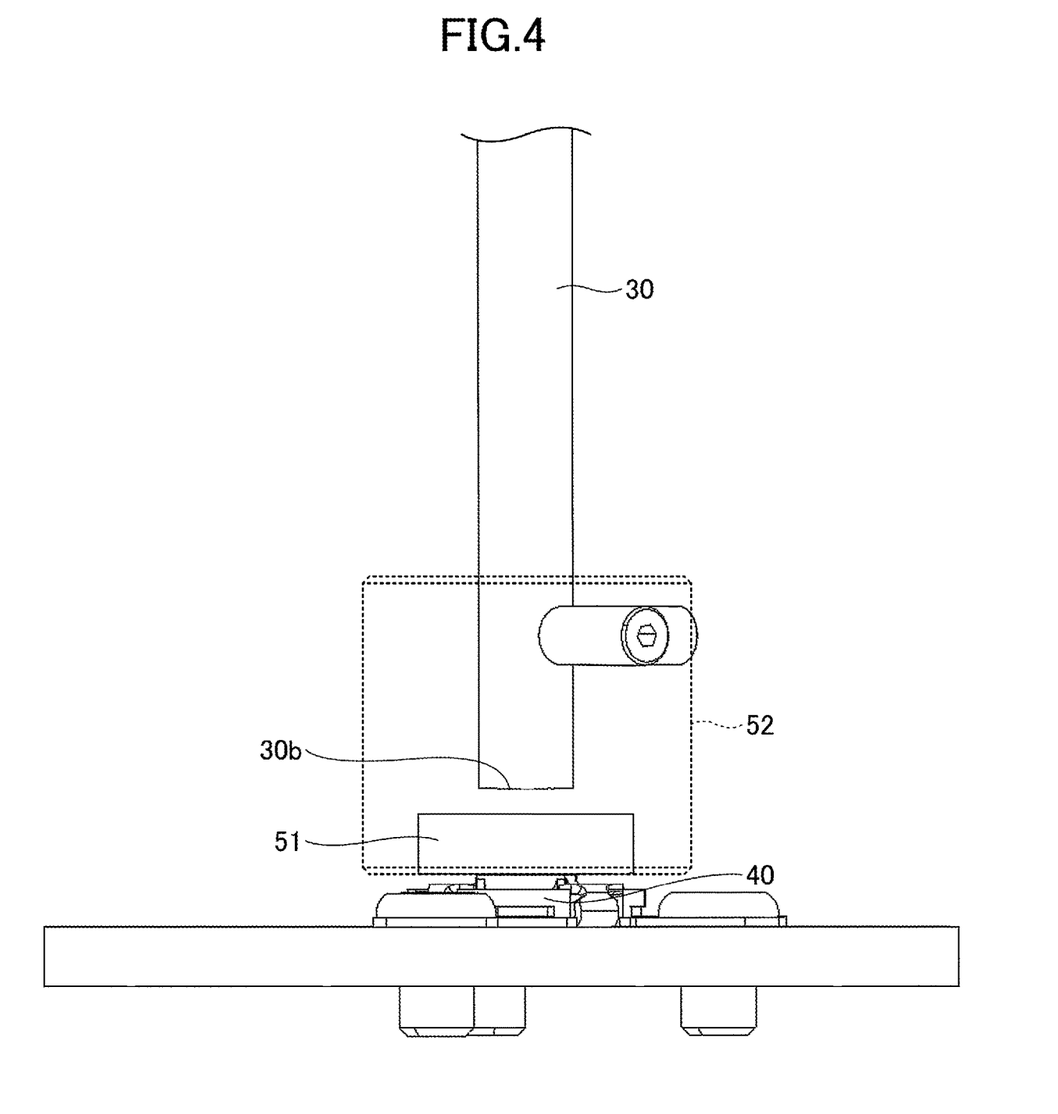
FIG. 4 is a side view of the portion in the operation input device according to the first embodiment where the strain detection element is provided.
Figure 5:
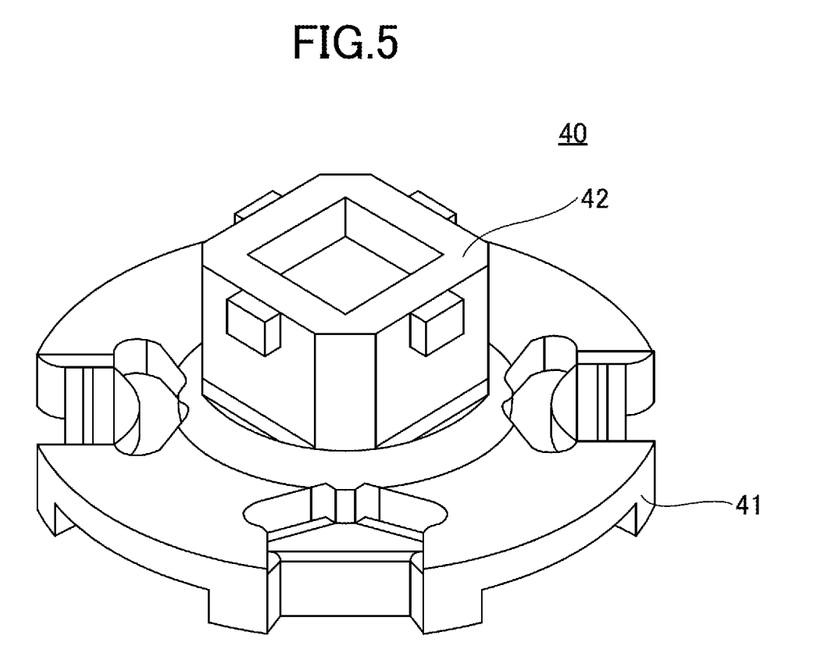
FIG. 5 is a perspective view of the strain detection element used in the operation input device according to the first embodiment.
Figure 6:
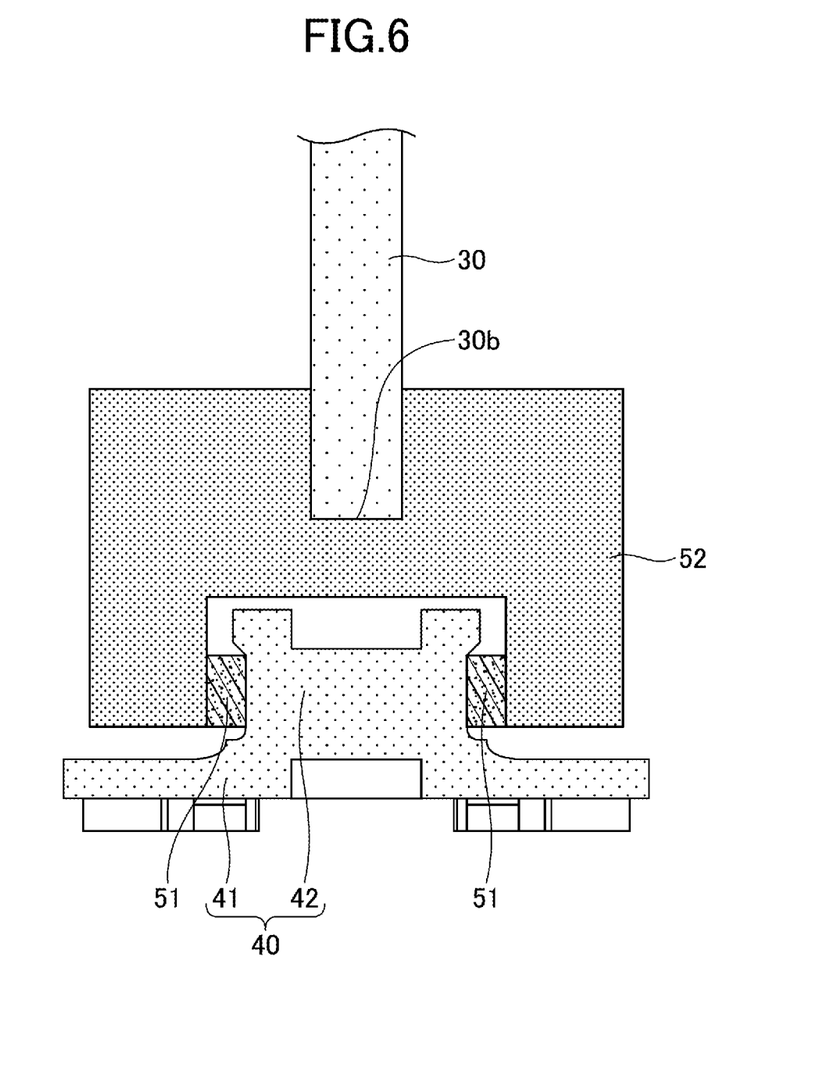
FIG. 6 is a diagram for explaining the portion in the operation input device according to the first embodiment where the strain detection element is provided.

Next, the relationship between the other end part 30b of the operating shaft 30 and the strain detection element 40 will be described below with reference to FIG. 3 to FIG. 6. FIG. 3 is an enlarged perspective view of the portion where the other end part 30b of the operating shaft 30 and the strain detection element 40 are provided, and FIG. 4 is its side view. FIG. 5 is a perspective view of the strain detection element 40. FIG. 6 is a cross-sectional view schematically showing the state of the portion where the other end part 30b of the operating shaft 30 and the strain detection element 40 are connected. Note that, in FIG. 3 and FIG. 4, for ease of explanation, the connecting member 52 and the like are shown with broken lines.

As shown in FIG. 5, the strain detection element 40 has a base part 41, and a projecting part 42 formed so as to protrude from the base part 41. When a force is applied, the projecting part 42 is slightly displaced and transmits strain to the base part 41. A strain resistance element placed underneath the base part 41 detects the amount of this strain, so that the force applied and its direction can be detected.

With the present embodiment, as shown in FIG. 6, elastic members 51, made of silicon rubber or the like, are provided in the periphery of the side surface portions of the projecting part 42 of the strain detection element 40. The strain detection element 40 provided with the elastic members 51, and the other end part 30b of the operating shaft 30 are connected by a connecting member 52. Consequently, the other end part 30b of the operating shaft 30 is inserted in the connecting member 52. This allows the operating force transmitted to the other end part 30b of the operating shaft 30 to act as a force to displace the projecting part 42.

Figure 7:
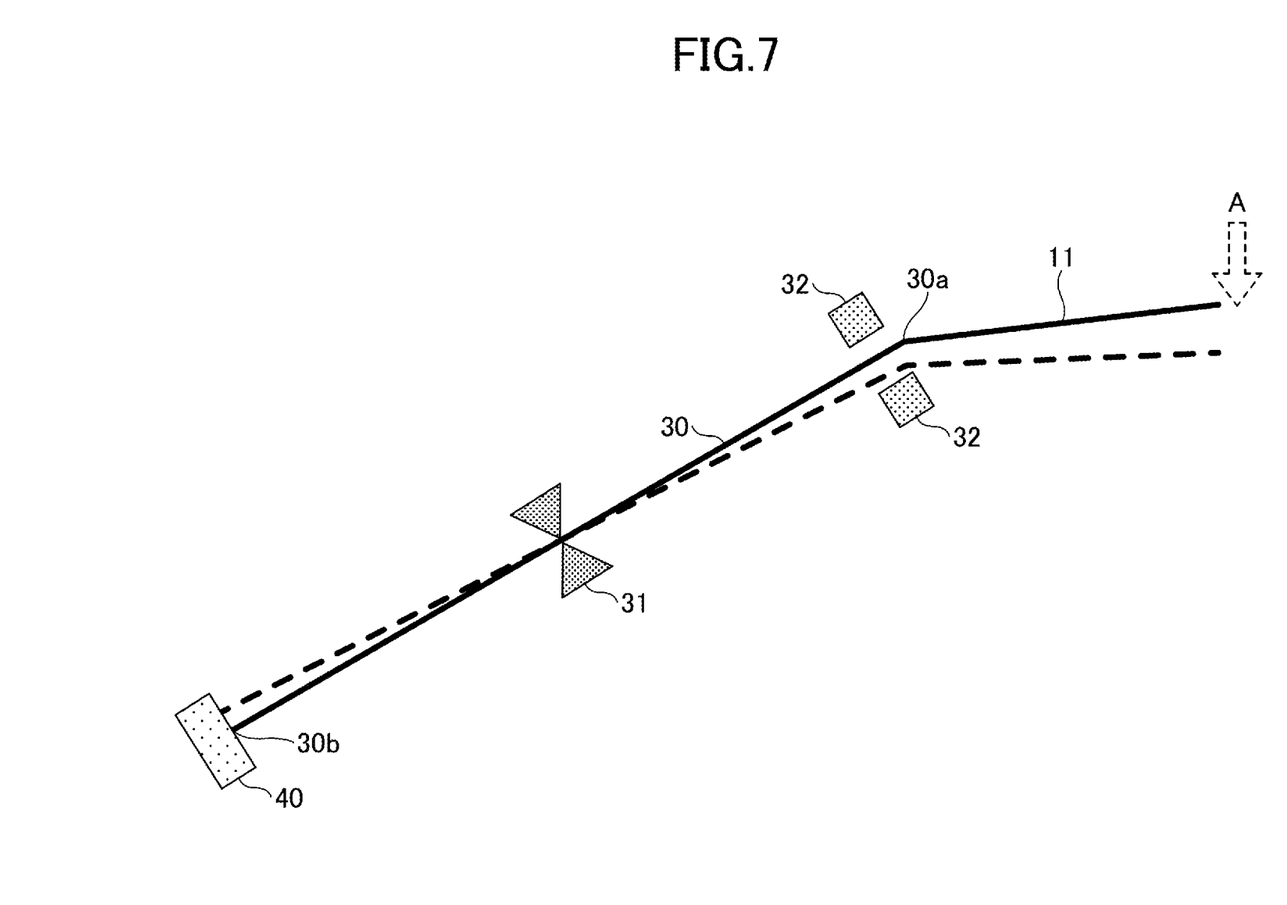
FIG. 7 is a schematic diagram for explaining the operation of the operation input device according to the first embodiment.

Next, the operation input of the operation input device according to the present embodiment will be described below with reference to FIG. 7. FIG. 7 is a diagram schematically showing a principal part in the structure of the operation input device according to the present embodiment. With the operation input device according to the present embodiment, when a force is applied to the operating part 11 in the direction indicated by the broken-line arrow A in FIG. 7, the operating part 11 is displaced slightly, as shown by the broken line. As the operating part 11 is displaced slightly like this, the operating shaft 30 connected to the operating part 11 moves. To be more specific, the operating shaft 30 is supported by a fulcrum part 31 in a substantially central portion of the operating shaft 30, and, when a force is applied to the operating part 11 and the operating part 11 is displaced, the operating shaft 30, being supported by the fulcrum part 31, rotates with the fulcrum part 31 serving as a fulcrum. Note that the position of the fulcrum part 31 is optimized based on the law of the lever. Therefore, when the operating part 11 is moved downward slightly as shown by the broken line arrow A, the other end part 30b of the operating shaft 30 moves upward, and the force induced by this movement is transmitted to the strain detection element 40 connected to the other end part 30b of the operating shaft 30, and produces a strain in the projecting part 42. Then, by detecting the strain produced in the projecting part 42, it is possible to detect the force with which the operation is made, and the direction of the operation, and sense that the operating part 11 is operated.

Since the strain detection element 40 can sense even a slight movement, the movement of the operating part 11 can be made smaller. For example, even when the operating part 11 moves in the direction indicated by the broken line arrow A by about 1 mm, this movement can be sensed. Meanwhile, given that moving the operating part 11 greatly might possibly result in breaking the strain detection element 40, with the present embodiment, a motion range limiting part 32 for limiting the movement of the operating shaft 30 is provided near one end part 30a of the operating shaft 30.

Now, when the operating part 11 moves only a little, the driver of the vehicle is unsure whether or not operation information is input by his/her operation. For example, heretofore, the operating part has moved relatively greatly, so that, by providing a cam or the like that gives the driver of a vehicle a feel of operation for recognizing that an operation is made, it has been possible to allow the driver to sense that operation information is input by his/her operation of the operating part. However, according to the present embodiment, mechanisms to restrict the movement of the operating part 11 and to give a feel of operation for sensing when an operation is made are provided separately.

Consequently, with the operation input device according to the present embodiment, a vibration generating element 70 that serves as a tactile feedback generating part for giving tactile feedback to a person is provided inside the operating part 11. The vibration generating element 70 is an element that vibrates at predetermined frequencies. When the operating part 11 is operated and moved, that movement is detected by the strain detection element 40. However, when an amount of strain beyond a predetermined value is detected, the strain detection element 40 judges that operation information has been input, and makes the vibration generating element 70 vibrate. Sensing the vibration of the vibration generating element 70, the driver of the vehicle can know that the operation has been made.

Figure 8:
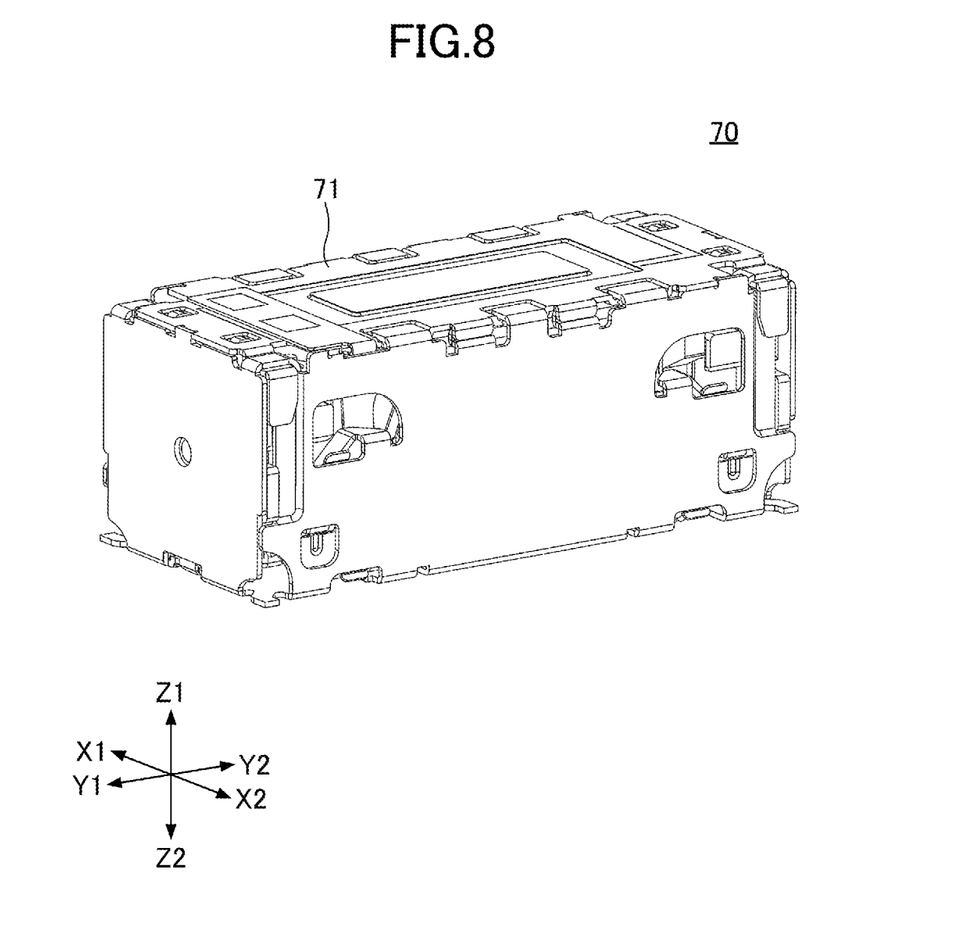
FIG. 8 is a perspective view of a vibration generating element used in the operation input device according to the first embodiment.

The vibration generating element 70 has a permanent magnet, and an iron core, which serves as a vibrating body with a coil wound around it, inside a rectangular parallelepiped housing 71, for example, as shown in FIG. 8. The vibrating body is supported by a spring member. When an electric current is applied to the coil, a magnetic field is produced, so that, by applying an alternating current through the coil, it is possible to produce a magnetic field that reverses alternately, and make the permanent magnet and the electromagnet including the coil attract or repel each other, thereby producing vibration.

The vibration produced in the vibration generating element 70 like this is transmitted to the operating part 11, and transmitted to the driver's hand touching the operating part 11. The driver of the vehicle feels the vibration in the operating part 11 through his/her hand, so that, even though the operating part 11 moves only a little, the driver can know that operation information has been input by operation of the operating part 11. The vibration generating element 70 can produce a variety of vibrations by changing the frequency and so forth, and transmit vibrations of varying tactile feels to the driver of the vehicle. For example, the vibration generating element 70 can produce a vibration in the X1-X2 direction, and a vibration in the Z1-Z2 direction, which is orthogonal to the X1-X2 direction.

As described above, with conventional operation input devices, a cam or the like has been used to have a feeling of whether an operation is made, but it has nevertheless been necessary to move the operating part to some extent when using a cam or the like. However, according to the present embodiment, vibration is produced in the vibration generating element 70 to let the vehicle's driver know when an operation is made on the operating part 11, so that it is possible to make the movement of the operating part 11 smaller.

Furthermore, as shown in FIG. 2, two capacitive sensors 61 and 62 are provided inside the operating part 11 of the operation input device according to the present embodiment. The capacitive sensors 61 and 62 have electrodes made of metal or the like formed on the surface of a flexible insulator substrate, and, when the hand approaches the capacitive sensors 61 and 62, the capacitance between the hand and the electrodes of the capacitive sensors 61 and 62 increases. The two capacitive sensors 61 and 62 are placed in a cylinder-like arrangement inside the operating part 11, and can sense operations about the central axis of the cylindrical operating part 11. Note that, in the present application, the capacitive sensors 61 and 62 may be also referred to as an "electrostatic sensing part."

Information about the electrostatic capacitance detected in the capacitive sensors 61 and 62 is transmitted to the control part 80. When a capacitance greater than or equal to a predetermined capacitance is detected in the capacitive sensors 61 and 62, the control part 80 may implement control so that it is possible to sense that the hand of the driver of the vehicle or the like has performed an operation.

According to the present embodiment, one of the capacitive sensors 61 and 62 is for controlling the fog lamps or the like to turn on and off, and the other one is for controlling the wipers to move and stop.

For example, although a structure is described here in which the capacitive sensors 61 and 62 sense operations about the central axis of the cylindrical operating part 11, it is also possible to employ a configuration in which the cylindrical operating part 11 is made rotatable, and actual rotation is sensed using an encoder.

Furthermore, for example, a configuration may be employed here in which a magnetic sensor is arranged in place of the strain detection element 40 serving as an operation sensing part, and a magnet is arranged on the other end part 30b side of the operating shaft 30, so that even a slight movement of the magnet can be sensed.

Second Embodiment

Figure 9:
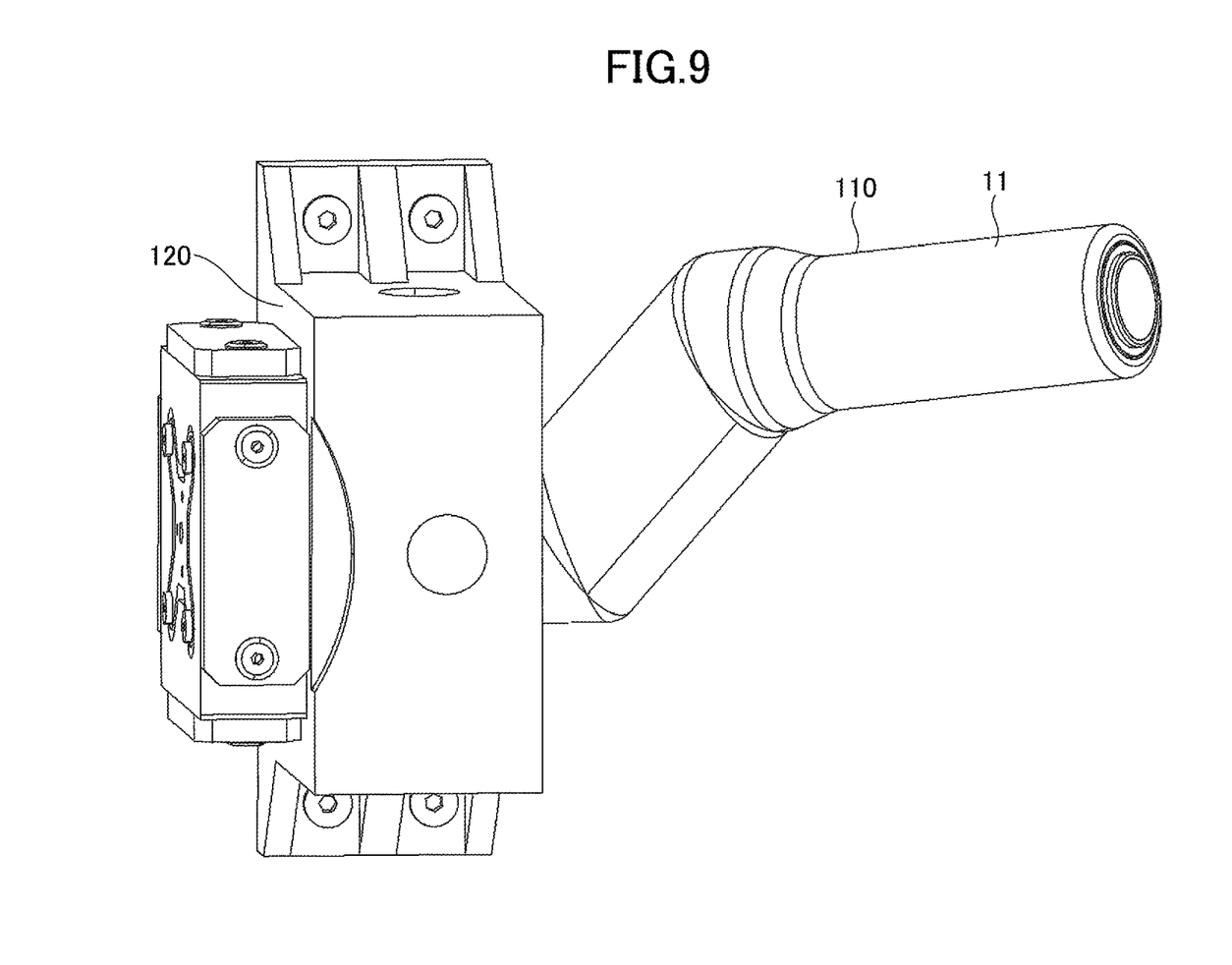
FIG. 9 is a perspective view of an operation input device according to a second embodiment.

Next, an operation input device according to a second embodiment will be described below with reference to FIG. 9 and FIG. 10. As shown in FIG. 9, the operation input device according to the present embodiment includes a lever part 110, and a support part 120 that supports the lever part 110. The lever part 110 is formed of a highly rigid resin or the like. In one side of the lever part 110, an operating part 11, which the driver of the vehicle actually operates with his/her hand, is provided. The end of the lever part 110, in the other side, is supported by the support part 120. In the present application, the lever part 110 may be also referred to as an "operating member." The support part 120 is attached to a predetermined portion of the vehicle, for example, in a portion near the steering.

Figure 10:
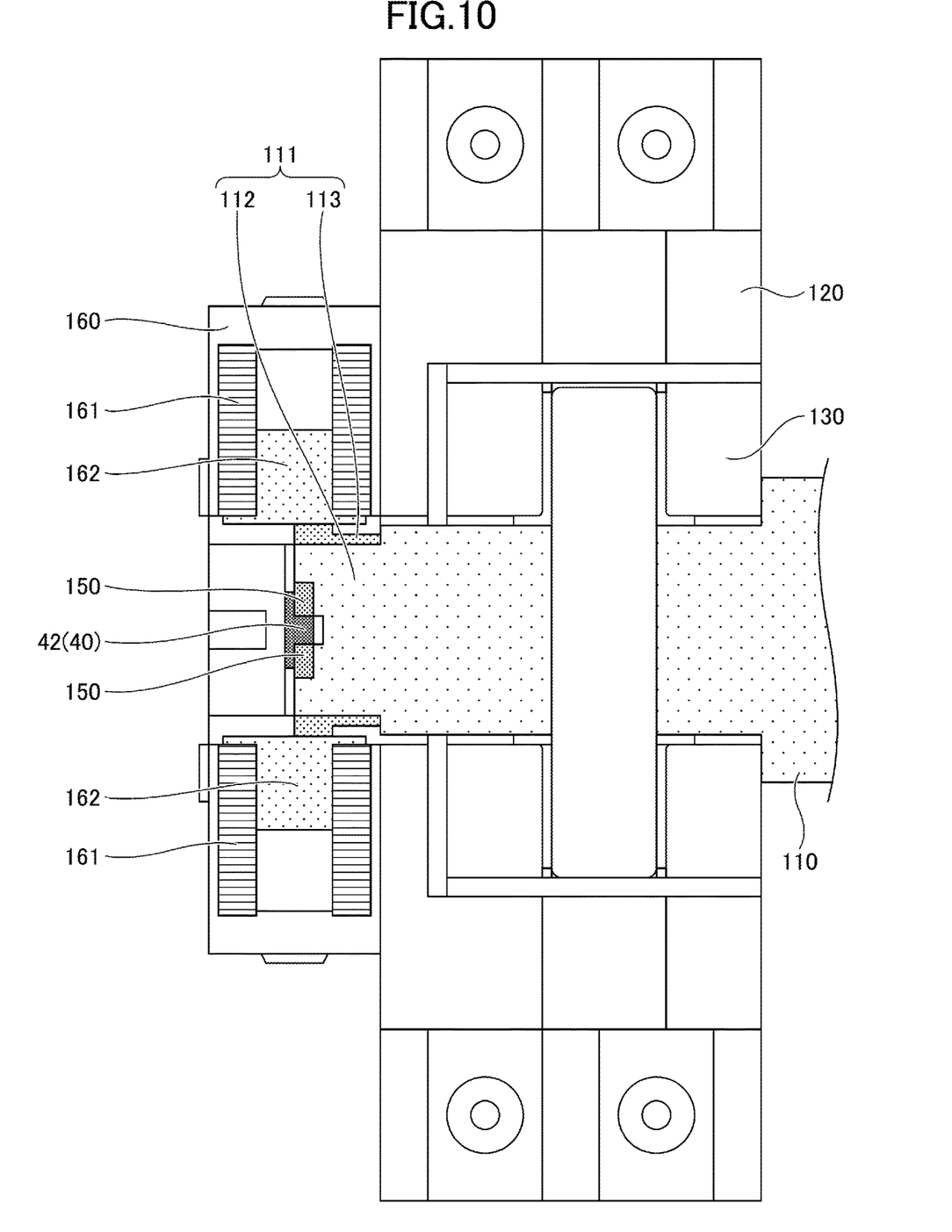
FIG. 10 is a cross-sectional view of a support part in the operation input device according to the second embodiment.

FIG. 10 is a cross-sectional view showing the inside of the operation input device according to the present embodiment. In the operation input device according to the present embodiment, the other side of the lever part 110 is supported by a gimbal 130 provided inside the support part 120. The lever part 110 can be moved only a little, with the portion supported by the gimbal 130 serving as a fulcrum. A connecting member 160 is provided in the periphery of the end part 111 of the other side of the lever 110.

At the other end part 111 of the lever 110, the periphery of a resin part 112 is covered with a reinforcing part 113, made of stainless steel or the like having higher rigidity than the resin part 112. A strain detection element 40, which serves as an operation sensing part, is provided inside the resin part 112. Elastic members 150 are provided between the inside of the resin part 112, and the projecting part 42 of the strain detection element 40 serving as an operation sensing part.

Figure 11:
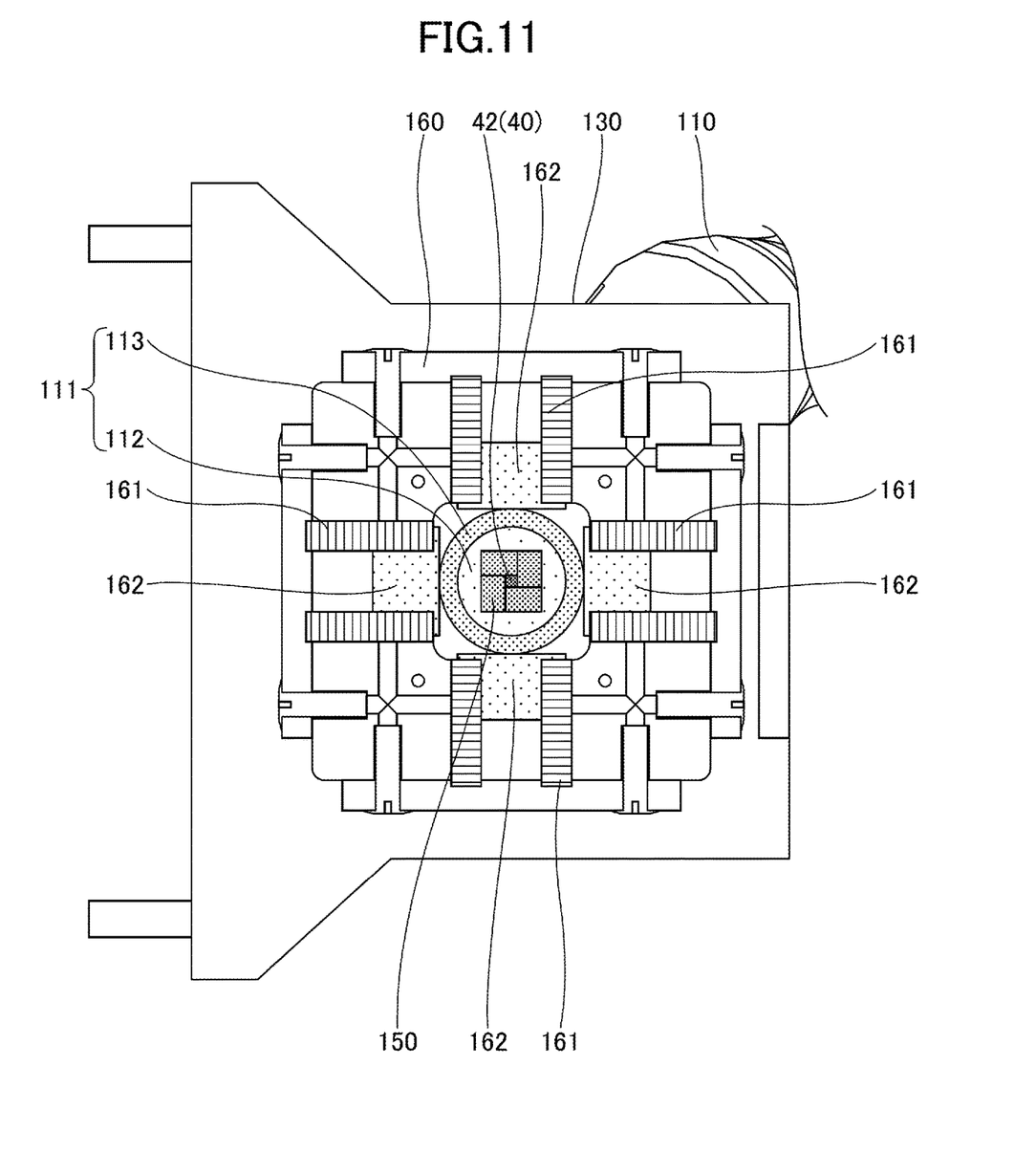
FIG. 11 is a diagram for explaining the support part in the operation input device according to the second embodiment.

As shown in FIG. 11, the inner resin part 112 of the end part 111 on the other side of the lever part 110, and the elastic members 150 are in contact with each other. When the operating part 11 of the lever part 110 is operated and the end part 111 on the other side of the lever part 110 moves, by this movement, a force is applied to the projecting part 42 of the strain detecting element 40 via the elastic member 150, so that the direction in which the force is applied and the magnitude of the force can be detected.

That is, as the end part 111 on the other side of the lever 110 moves two-dimensionally, the projecting part 42 of the strain detection element 40, provided inside the end part 111 on the other side of the lever 110, is pushed via the elastic member 150, so that the direction of the force applied to the lever part 110 and the magnitude of the force can be detected.

Furthermore, in the connecting member 160, compression coil springs 161, which serve as elastic members, are provided in all four directions in FIG. 11, that is, the up, down, left, and right directions, in the housing of the connecting member. Spring receiving members 162 are provided between the outer reinforcing part 113 of the end part 111 on the other side of the lever part 110, and the compression coil springs 161.

To be more specific, the reinforcing part 113 that constitutes the outer side of the end part 111 on the other side of the lever part 110 and the spring receiving members 162 are in contact with each other. In the compression coil springs 161 provided on the outer side of each spring receiving member 162, a restoring force to propel the spring receiving member 162 towards the reinforcing part 113 is produced. As a result of this, the end part 111 of the other side of the lever part 110 assumes a position in which the restoring force of each compression coil spring 161 is balanced.

By operating the operating part 11 of the lever part 110, the lever part 110 moves, with the portion supported by the gimbal 130 serving as a fulcrum. Accompanying this, the end part 111 of the other side of the lever 110 moves two-dimensionally. This makes the compression coil springs 161 located in the direction of the movement contract, have a larger restoring force, and restrict the movement of the lever part 110. That is, according to the present embodiment, even when a relatively large force is applied to the operating part 11 of the lever part 110, the compression coil springs 161 contract and have a larger restoring force, so that the lever part 110 is not displaced significantly.

Although the operating shaft 30 of the first embodiment is relatively thin and easy to bend, according to the present embodiment, the lever part 110 is made of a highly rigid material and hard to bend, and therefore can sense even a slight movement of the lever part 110.

The contents other than the above are the same as those of the first embodiment.

The present disclosure is not limited to these embodiments, and various variations and modifications may be made without departing from the scope of the present invention.

What is claimed is:

1. An operation input device to be mounted on a vehicle, the operation input device comprising:
   a support part to be attached to the vehicle;
   an operating member supported by the support part and configured to be operated by a person;
   an operation sensing part configured to sense an operation on the operating member;
   a tactile feedback generating part provided inside the operating member and configured to give tactile feedback to the person; and
   a control part configured to control the tactile feedback generating part to produce the tactile feedback when the operation is sensed in the operation sensing part, wherein:
   the operating member is provided so as to extend from the support part in a first direction intersecting a traveling direction of the vehicle;
   the operating member is restricted so as not to rotate in a swing operation in which a direction intersecting the first direction serves as an axis of rotation;
   the operating member includes:
   an operating part; and
   an operating shaft supported by a fulcrum part, wherein
   the operating shaft includes one end part and another end part opposite to the one end part, the fulcrum part supporting the operating shaft at a position between the one end part and the another end part;
   the one end part of the operating shaft is connected to the operating part; and
   the operating shaft, being supported by the fulcrum part, moves in response to the operating part being operated and moved by the person, and the force is applied to the operation sensing part via the another end part of the operating shaft.

2. The operation input device according to claim 1, wherein the operation sensing part is provided inside the support part.

3. The operation input device according to claim 1, wherein the operation sensing part detects a force and direction of the operation on the operating member.

4. The operation input device according to claim 1, wherein:
   the operation sensing part is a strain detection element;
   the operating member includes a cylindrical part provided between the operating part and the support part; and
   the operating shaft is provided inside the cylindrical part.

5. The operation input device according to claim 4, wherein a motion range limiting part configured to restrict the movement of the operating shaft is provided between the fulcrum part and the operating part inside the cylindrical part.

6. The operation input device according to claim 4, wherein the strain detection element and the another end part of the operating shaft are connected by a connecting member.

7. The operation input device according to claim 4, wherein:
   an elastic member is provided in a periphery of a projecting part of the strain detection element; and
   a connecting member is attached in a periphery of the elastic member.

8. An operation input device to be mounted on a vehicle, the operation input device comprising:
   a support part to be attached to the vehicle;
   an operating member supported by the support part and configured to be operated by a person;
   an operation sensing part configured to sense an operation on the operating member;
   a tactile feedback generating part provided inside the operating member and configured to give tactile feedback to the person; and
   a control part configured to control the tactile feedback generating part to produce the tactile feedback when the operation is sensed in the operation sensing part, wherein:
   the operating member is provided so as to extend from the support part in a first direction intersecting a traveling direction of the vehicle;
   the operating member is restricted so as not to rotate in a swing operation in which a direction intersecting the first direction serves as an axis of rotation, wherein the operating member is supported by a gimbal provided in the support part; and in response to the person operates and moves the operating part, the operating member moves, with a portion supported by the gimbal serving as a fulcrum, and the force is applied to the operation sensing part via an end part on the another side of the operating member.

9. The operation input device according to claim 8, wherein a first elastic member configured to restrict the movement of the operating member is provided in an outer periphery of the another side of the operating member.

10. The operation input device according to claim 1, wherein an electrostatic sensing part is provided inside the operating part.

11. The operation input device according to claim 10, wherein:

the operating part is formed in a cylinder-like shape; and the electrostatic sensing part is placed in a cylinder-like arrangement inside the operating part, and detects an operation about a central axis of the cylindrical operating part.

12. The operation input device according to claim 10, wherein two electrostatic sensing parts are provided.

13. An operation input device to be mounted on a vehicle, the operation input device comprising:

a support part to be attached to the vehicle;

an operating member supported by the support part and configured to be operated by a person;

an operation sensing part configured to sense an operation on the operating member;

a tactile feedback generating part provided inside the operating member and configured to give tactile feedback to the person; and a control part configured to control the tactile feedback generating part to produce the tactile feedback when the operation is sensed in the operation sensing part, wherein:

the operating member is provided so as to extend from the support part in a first direction intersecting a travelling direction of the vehicle;

the operating member is restricted so as not to rotate in a swing operation in which a direction intersecting the first direction serves as an axis of rotation, and wherein the tactile feedback generating part is a vibration generating element configured to produce vibration.

14. The operation input device according to claim 8, wherein:

the operation sensing part is a strain detection element.

15. The operation input device according to claim 1, wherein the fulcrum part is supported by a fulcrum part supporter, the fulcrum part supporter being supported by the support part.

16. The operation input device according to claim 14, wherein:

a second elastic member is provided in a periphery of the projecting part of the strain detection element; and the second elastic member is provided on an inner side of the end part on the another side of the operating member.

* * * * *